United States Patent
Silberbauer

(10) Patent No.: US 12,486,934 B2
(45) Date of Patent: Dec. 2, 2025

(54) PLUG-IN INSERT

(71) Applicant: AVS, Ingenieur J.C. Römer GmbH, Grafenau (DE)

(72) Inventor: Günther Silberbauer, Grafenau (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 24 days.

(21) Appl. No.: 18/326,786

(22) Filed: May 31, 2023

(65) Prior Publication Data

US 2023/0392734 A1    Dec. 7, 2023

(30) Foreign Application Priority Data

Jun. 2, 2022 (EP) ..................... 22176922

(51) Int. Cl.
F16L 37/091    (2006.01)

(52) U.S. Cl.
CPC ................ F16L 37/0915 (2016.05)

(58) Field of Classification Search
CPC ............... F16L 37/091; F16L 37/0915
See application file for complete search history.

(56) References Cited

U.S. PATENT DOCUMENTS

| | | | |
|---|---|---|---|
| 5,487,572 A | 1/1996 | Combot-Courrau et al. | |
| 6,312,019 B1 * | 11/2001 | Nakazumi | F16L 37/0915 |
| 6,764,102 B2 * | 7/2004 | Ezura | F16L 37/0926 |
| 10,006,575 B2 * | 6/2018 | Bobo | F16L 37/0915 |
| 10,151,416 B2 | 12/2018 | Taneya et al. | |
| 2005/0285394 A1 | 12/2005 | Muto | |
| 2009/0033090 A1 | 2/2009 | Stoll et al. | |
| 2014/0183858 A1 * | 7/2014 | Hanne | F16L 37/091 |
| 2015/0145249 A1 | 5/2015 | Taneya et al. | |

FOREIGN PATENT DOCUMENTS

| | | | |
|---|---|---|---|
| CN | 1727742 A | 2/2006 | |
| DE | 10162658 A1 | 7/2003 | |
| DE | 19803918 B4 | 7/2009 | |
| DE | 112013003524 T5 | 3/2015 | |
| FR | 2873185 A1 * | 1/2006 | F16L 37/0915 |
| WO | 2006105849 A1 | 10/2006 | |

OTHER PUBLICATIONS

European Search Report mailed Nov. 7, 2022, issued in corresponding European Application No. 22176922.7-1015, filed Oct. 24, 2022, 11 pages.

* cited by examiner

*Primary Examiner* — Zachary T Dragicevich
(74) *Attorney, Agent, or Firm* — Christensen O'Connor Johnson Kindness PLLC

(57) ABSTRACT

A plug-in insert designed for releasably coupling a tubular element to the main body is disclosed. The plug-in insert can have a plug-in sleeve, a fixing element, and a release member. The fixing element can releasably fix the tubular element inserted via an insertion opening in the plug-in sleeve, and the release member cooperating with the fixing element in such a way that the fixing of the tubular element is released by an axial movement of the release member relative to the plug-in sleeve. The plug-in sleeve can include a sleeve portion formed of at least one wall element being formed by stamping and bending a metallic flat material portion into a bowl-shaped or circumferentially closed element. The fixing members can be formed by a plurality of claws or detents arranged circumferentially, by at least one rib, or fixed in the main body by shaping an edge region of the main body.

10 Claims, 6 Drawing Sheets

PLUG-IN INSERT

CROSS-REFERENCE TO RELATED APPLICATION

This application claims priority to European Application Number 22176922.7, filed Jun. 2, 2022, the disclosure of which is hereby incorporated by reference.

FIELD

The present disclosure relates to a plug-in insert.

BACKGROUND

Plug-in inserts for the releasable coupling of a tubular element, for example a hose, to a main body, for example a housing of a hose coupling, a valve, a sensor, a pump, etc., are known, for example from the applicant's own publication DE 10 2018 121 440 A1.

Viewed in the axial direction, the known plug-in insert has a two-part plug-in sleeve, consisting of a press-in sleeve and a support ring, a fixing element arranged in the plug-in sleeve as a claw ring, and a release member which cooperates with the fixing element in such a way that, when the release member is pressed into the plug-in sleeve, the claws of the fixing element are deformed and the tubular element can thus be pulled out of the main body.

A major disadvantage of the known plug-in insert is that the production and the joining together of the individual parts of the plug-in insert are very complex. Up till now, the plug-in sleeve or its individual parts must be produced by means of machining and then be assembled.

SUMMARY

Based on this, the object of the present disclosure is to provide a plug-in insert, the production and assembly effort of which is reduced so that the production costs can be lowered.

This object is achieved by a plug-in insert comprising the features of independent claim 1. Preferred embodiments are the subject matter of the subclaims.

According to a first aspect, a plug-in insert is disclosed. The plug-in insert is designed to be inserted into a main body and is used to releasably couple a tubular element to the main body. The plug-in insert includes a plug-in sleeve, a fixing element and a release member. The fixing element is designed to releasably fix a tubular element, inserted via an insertion opening, in the plug-in sleeve. The release member cooperates with the fixing element in such a way that the fixing of the tubular element is released by an axial movement of the release member relative to the plug-in sleeve. The plug-in sleeve comprises a sleeve portion which is formed from at least one wall element. The wall element is formed by stamping and bending a metallic portion of flat material into a shell-shaped or circumferentially closed element. According to a first alternative, fixing members integral with the plug-in sleeve are provided for fixing the plug-in sleeve in the main body. The fixing members are provided for fixing the plug-in insert in the main body. The fixing members are formed by a plurality of claws or detents distributed circumferentially over the plug-in sleeve or by at least one rib. According to a second alternative, the plug-in sleeve is designed to be fixed in the main body by forming an edge region of the main body.

The technical advantage of the plug-in insert is that the plug-in sleeve thereof can be produced by stamping and bending shaping technique with reduced effort and thus at low cost. In addition, by fixing the plug-in insert in the main body, a secure anchoring of the plug-in insert in the main body is achieved.

According to one exemplary embodiment, the plug-in sleeve has a flange at a second free end opposite to the insertion opening to form a contact surface for a sealing element, by means of which the transition between the tubular element and the main body is sealed. Due to the planar abutment of the sealing element on the flange, the sealing element is held in position by the plug-in insert.

According to one exemplary embodiment, the claws by means of which the plug-in insert is fixed in the main body are provided in the region of the flange. By providing the claws in the region of the flange, it is possible to reduce the height of the plug-in insert. In addition, the use of claws allows the plug-in insert to be pressed in with less force compared to a plug-in insert held in the main body by press-fitting.

The claws can project obliquely upwards in the direction of the insertion opening and can be designed, for example, to hook in the main body, in some embodiments in a bead of the main body, in order to effectively prevent the plug-in insert from being released from the main body. It should be mentioned, however, that hooking of the claws in a main body formed of a plastic material is also possible without a bead or without a groove in the wall of the main body. In this case, the claws are pressed directly into the groove- or bead-free wall of the main body.

According to one exemplary embodiment, the flange comprises a plurality of flange segments which project radially outwards with respect to a longitudinal axis of the plug-in insert and are spaced apart from one another in the circumferential direction. The claws are provided in a circumferentially distributed fashion in the intermediate spaces forming between the flange segments, namely one or more claws in each case in an intermediate space forming between two successive flange segments. Thus, first regions of the flat material provided in the region of the second free end of the plug-in insert can be used to form the flange and second regions of the flat material, which are also provided in the region of the second free end of the plug-in insert, can be used to form the claws. The flange segments can also be used to center the free end of the plug-in sleeve in the main body.

According to one exemplary embodiment, the plug-in sleeve has a bead in which the fixing element is held at the edge. This allows the fixing element which is, for example, a separate annular element, to be interlockingly held in the plug-in sleeve.

According to one exemplary embodiment, the fixing element is fixed at the edge in a bead of the sleeve portion of the plug-in sleeve. In other words, the bead of the sleeve portion forms a circumferential bulge into which the edge of the fixing element is inserted and thus held in the bead in an interlocking fashion. In this case, the fixing element can be inserted into the plug-in sleeve when the wall element forming the sleeve portion is bent together or when the sleeve portion consisting of a plurality of wall elements is assembled. Alternatively, the fixing element can be pressed axially into the sleeve portion and held in the plug-in sleeve by means of a snap mechanism. Thus, the fixing element can be inserted into the plug-in sleeve after the formation of the circumferentially closed sleeve portion.

According to one exemplary embodiment, the outer wall portion of the plug-in sleeve forms the at least one rib in the region of the bead in which the fixing element is held, or the outer wall portion includes the rib. The at least one rib allows the plug-in insert to be fixed in the main body by press-fitting.

According to one exemplary embodiment, the detents by means of which the plug-in sleeve is anchored in the main body are provided in a wall portion of the plug-in sleeve between a first free end of the plug-in sleeve, which is provided in the region of the insertion opening, and the fixing element. The detents are formed by material portions of the plug-in sleeve which are stamped free in certain areas and project radially outwards at an angle. With this type of fixing, the plug-in insert can be secured in the main body in the region above the fixing element, i.e. in the region of the insertion opening.

According to one exemplary embodiment, the sleeve portion is formed by a single piece of flat material that is stamped, formed and bent together to form a circumferentially closed element. Thus, the sleeve portion can be produced by a single piece of flat material by means of a multi-stage stamping, bending and forming process. The stamping, bending and forming process achieves, in some embodiments, that two longitudinal sides of the piece of flat material, which are initially spaced apart from one another, come to lie so as to be oriented relative to one another and to border on one another. The longitudinal sides of the piece of flat material can be fixed relative to one another at the joint that is formed, for example by an interlocking and/or integrally bonded connection, in some embodiments by welding.

According to one exemplary embodiment, the sleeve portion comprises at least two stamped, formed flat material pieces that are bent to have the shape of a shell or bowl as wall elements, which are joined together to form a circumferentially closed sleeve portion. In other words, a plurality of shell-shaped wall elements is produced simultaneously or successively in a stamping, bending and forming process. The shell-shaped wall elements have a convex shape on the outside. A circumferentially segmented sleeve portion is formed by assembling the wall elements in such a way that one longitudinal side of one wall element borders on the longitudinal side of the next wall element. The longitudinal sides bordering on one another can, for example, be spot-welded. In some embodiments, the sleeve portion is formed from two half-bowl-shaped wall elements. Due to the circumferential segmentation of the sleeve portion, the sleeve portion can be manufactured by means of a stamping and bending process despite complex forming processes.

According to one exemplary embodiment, the plug-in sleeve has, at a first free end where the insertion opening for the tubular element is provided, a collar portion formed by edge bending of the metallic flat material of the wall element or by a separate collar element. The collar portion can thus either be formed integrally on the wall element or a separate collar element can be applied to the sleeve portion. The collar portion or the collar element is designed to overlap an annular gap between the sleeve portion and the main body, which gap circumferentially surrounds the sleeve portion.

According to one exemplary embodiment, the collar element is a ring-like designed element made of a flat material and having a wall portion projecting angularly from an upper surface and being closed on the outer circumferential side. As a result, the collar element can also be formed from a flat material, for example by deep drawing or another forming process.

According to one exemplary embodiment, the collar element has a plurality of stop portions on the inner circumferential side in order to confine the axial movement path of the release member. On the outer circumferential side, the release member can have a projection or a shoulder which cooperates with the stop portions to confine the axial movement path. Thus, the collar element can prevent an undesired release of the release member from the plug-in sleeve.

According to one exemplary embodiment, the collar element is placed on the sleeve portion of the plug-in sleeve at the free end and is connected thereto in a force-locking and/or firmly bonded manner. The collar element can also be designed to at least partially overlap the wall of the sleeve portion at the free end. This allows the collar element to be fixed to the sleeve portion. At the same time, the stability of the plug-in sleeve can be improved by means of the collar element.

According to one exemplary embodiment, the collar element has an inclined surface or a shoulder on the outer circumferential side, which is designed to be embraced by a shaped edge region of the main body in order to fix the plug-in insert in the main body. Due to the sectional overlapping of the collar element, a secure fixation of the plug-in insert in the main body can be achieved.

According to one exemplary embodiment, the fixing element is a disk-shaped claw ring which is fixed in the plug-in sleeve and has a plurality of reversibly bendable claws on the inner circumferential side in order to fix the tubular element. Without an annular element inserted into the claw ring, the claws point radially or substantially radially inwards and are deformed in the insertion direction when a tubular element is inserted into the claw ring so that the claws engage in the wall of the tubular element at the free end and thereby prevent the tubular element from being pushed out counter to the insertion direction.

According to one exemplary embodiment, the fixing element has a curvature in the transition region between an annular portion of the claw ring and the claws, the convex side of which is oriented in the direction of the insertion opening. The curvature can be provided circumferentially. Due to the curvature, a snap of the fixing element can be achieved when the release member is inserted, which is advantageous for the haptics and operation of the release member.

According to one exemplary embodiment, the sleeve portion is tapered in a funnel shape between a central region in which the fixing element is held and a second free end of the plug-in sleeve opposite to the insertion opening. As a result, the sleeve portion tapers towards the second free end where it can form a contact surface for a sealing element. In addition, the funnel-shaped taper of the sleeve portion can be used to achieve lateral guidance of the tubular element so that it can be inserted into the sealing element in a centered manner.

According to one exemplary embodiment, the plug-in sleeve is manufactured from a stainless steel strip material. As a result, the plug-in insert can be used for food applications and a high cost saving can be achieved due to the reduced material usage. As an alternative to stainless steel, it is also possible to use other materials, for example brass, bronze or aluminum.

According to one exemplary embodiment, the release member has hooks on the outside which engage in recesses of the plug-in sleeve and confine a sliding movement of the detachment element away from the fixing element. Alternatively, the release member can have recesses in which projections of the plug-in sleeve provided on the inner circumferential side engage in order to confine a sliding movement of the release member away from the fixing element.

In some embodiments, the plug-in insert is designed for continuous pressures of up to 20 bar and pressure peaks of up to 100 bar.

For example, the plug-in insert can be designed for outer diameters of the tubular element in the range between 2 mm and 40 mm, and in some embodiments in the range from 4 mm to 32 mm.

The "stamping and bending process" in the sense of the present disclosure is understood to mean a forming process in which a metallic stamping is specifically formed by bending, embossing and/or deep drawing.

The term "metal" as used in the present disclosure is understood to mean a pure metal or an alloy comprising a plurality of different metals.

The expressions "approximately", "substantially" or "about" mean in the sense of the present disclosure deviations from the respective exact value by +/−10%, in some embodiments by +/−5%, and/or deviations in the form of changes which are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
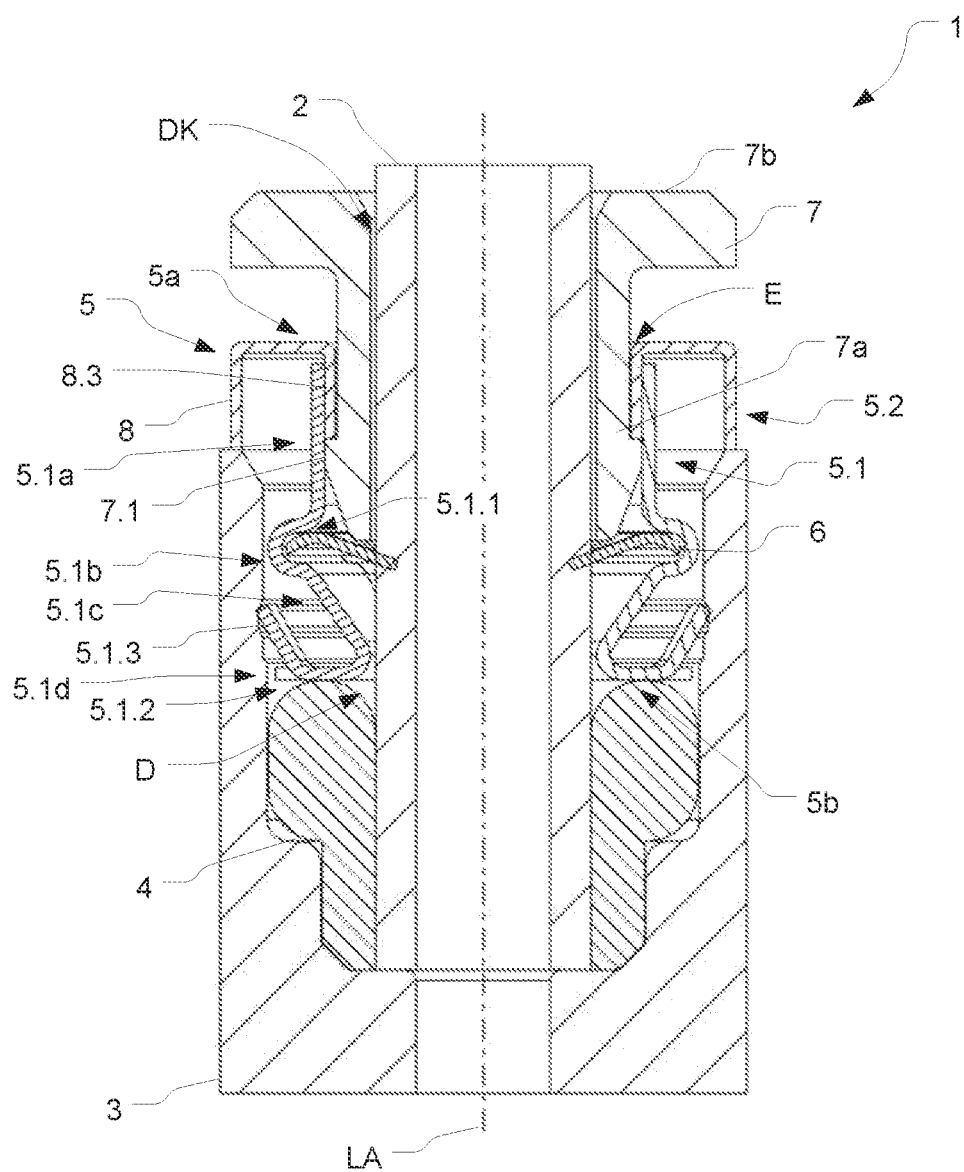
FIG. 1 shows, by way of example, a longitudinal a longitudinal sectional view of a first exemplary embodiment of a plug-in insert.
Figure 2:
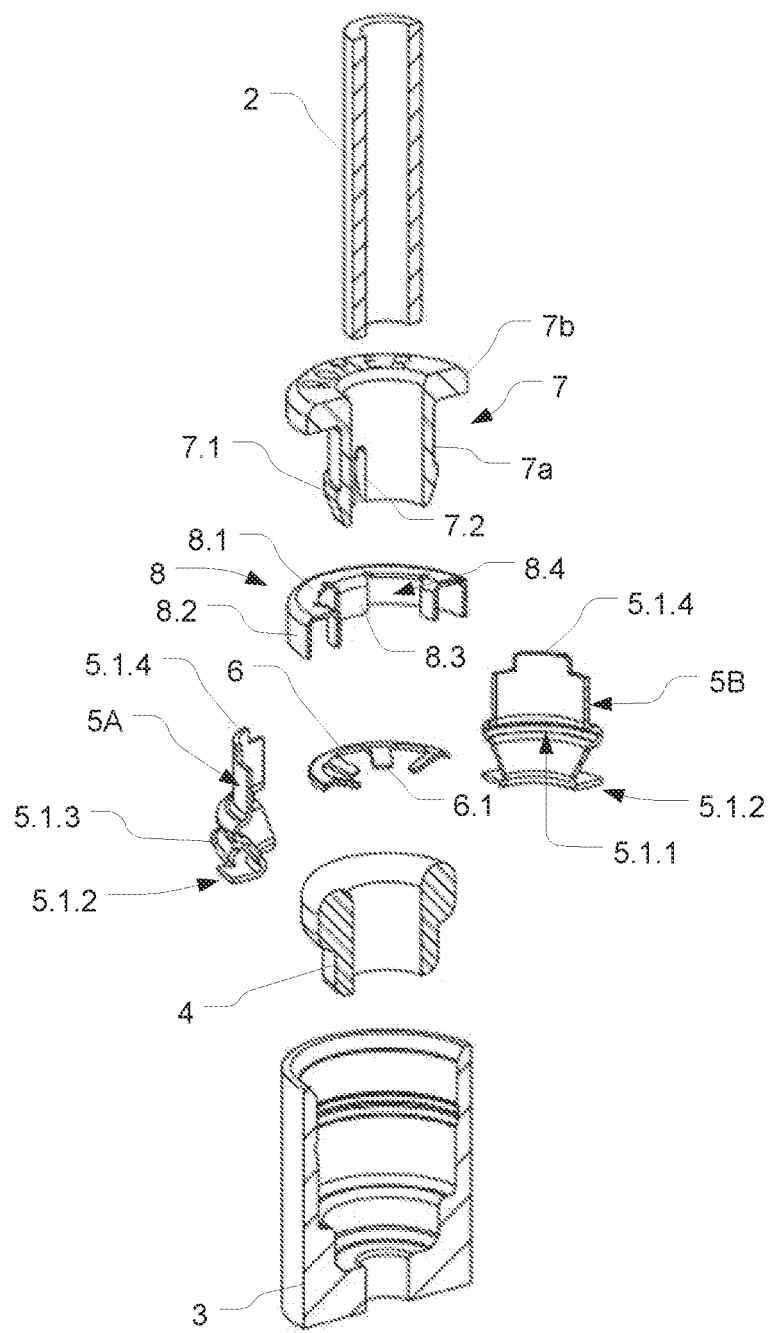
FIG. 2 shows, by way of example, a longitudinal sectional exploded view of the first exemplary embodiment of a plug-in insert illustrated in FIG. 1.

FIGS. 1 and 2 show a first exemplary embodiment of a plug-in insert 1. The plug-in insert 1 is used to releasably fix a tubular element 2 within a main body 3. The tubular element 2 can, for example, be a hose or a tube with a circular cross-section. The main body 3 can be, for example, a housing of a hose coupling, a valve, a distributor, a sensor, a pump, etc.

The plug-in insert 1 forms a coupling piece between the tubular element 2 and the main body 3, and is designed to be inserted into an opening in the main body 3. The interior of the plug-in insert 1 has a receiving space, into which a free end of the tubular element 2 can be inserted and fixed so that by fixing the plug-in insert 1 in the main body 3 and fixing the tubular element 2 in the plug-in insert 1, the tubular element 2 is releasably held in the main body 3. A sealing element 4 is provided for sealing the transition between the tubular element 2 and the main body 3. As shown in FIGS. 1 and 2, the sealing element 4 can be designed as an elastomer molded part or can also be an O-ring, for example.

The plug-in insert 1 comprises a plug-in sleeve 5, a fixing element 6 and a release member 7. The plug-in sleeve 5 is of hollow-body design and forms, at least in sections, the circumferential wall of the plug-in insert 1. The plug-in sleeve 5 has an insertion opening E at a first free end 5a, via which the tubular element 2 can be inserted into the plug-in insert 1. Adjacent to the insertion opening E, a lead-through channel DK is formed in the interior of the plug-in sleeve 5, into which the tubular element 2 can be inserted.

The fixing element 6 is accommodated in the interior of the plug-in sleeve 5. The fixing element 6 is designed to anchor the tubular element 2 in the plug-in insert 1 in the axial direction. In the illustrated exemplary embodiment, the fixing element 6 is a ring-like element. On the outer circumferential side, the fixing element 6 is fixed in the plug-in sleeve 5 in an interlocking manner. In the illustrated embodiment, the edge region of the fixing element 6 provided on the outer circumferential side dips into a bead 5.1.1 of the plug-in sleeve 5 provided on the inner circumferential side, as a result of which the fixing element 6 is held in the plug-in sleeve 5 in the axial direction.

The fixing element 6 has a plurality of claws 6.1 at the inner edge. In other words, the fixing element 6 is designed as a claw ring. The claws 6.1 are arranged around a lead-through opening of the fixing element 6. The diameter of the lead-through opening is smaller than the outer diameter of the tubular element 2 so that the claws 6.1 are deformed when the tubular element 2 is inserted in the insertion direction and engage in the wall of the tubular element 2 after a final insertion position is reached. In this way, the fixing element 6 ensures that the tubular element 2 cannot detach from the plug-in insert 1 in an undesirable manner.

The release member 7 is designed to release the engagement of the claws 6.1 of the fixing element 6 in the tubular element 2 so that the tubular element 2 can be pulled out of the plug-in insert 1 again. The release member 7 can be sleeve-shaped and has a lead-through channel in its interior, through which the tubular element 2 can be pushed.

The release member 7 is inserted into the plug-in sleeve 5 via the insertion opening E. The free end of the release member 7, which lies in the plug-in sleeve 5, is designed to cooperate with the claws 6.1 of the fixing element 6 in such a way that the free end of the release member 7 presses the claws 6.1 downwards in the insertion direction during the axial insertion of the release member 7, thereby cancelling the engagement of the claws 6.1 in the wall of the tubular element 2.

The plug-in sleeve 5 has a sleeve portion 5.1 and a collar portion 5.2. The sleeve portion 5.1 forms the wall of the plug-in sleeve 5 and circumferentially encloses a lead-through channel DK. The sleeve portion 5.1 has a round-tube-like design in a first region 5.1a, which directly adjoins the first free end 5a.

The first portion is followed by a second region 5.1b, on which the bead 5.1.1 is formed on the inner circumferential side by embossing the flat material. The fixing element 6 is received in this bead 5.1.1 with its outer edge and is thus fixed in the sleeve portion 5.1 in an interlocking manner.

In the direction of the second free end 5b, the second region 5.1b is followed by a third region 5.1c, in which the sleeve portion 5.1 is tapered towards the second free end 5b. In other words, the wall of the sleeve portion 5.1 is designed to taper in a funnel shape in the third region 5.1c. As a result, the inserted tubular element 2 is centered and thus supplied in the correct position to the lead-through opening D formed at the second free end 5b.

A fourth region 5.1d of the sleeve portion 5.1 is provided at the second free end 5b of the plug-in sleeve 5, at which a flange 5.1.2 is formed. The flange 5.1.2 is formed, for example, by one or more flat material portions that project radially outwards and are planar. The flange 5.1.2 comes here to lie in a plane that runs perpendicularly to the longitudinal axis LA of the plug-in insert 1.

The flange 5.1.2 can have the shape of a circular ring or a plurality of flange segments designed as circular-ring segments. The flange 5.1.2 forms a contact surface for the sealing element 4, which seals the transition between the tubular element 2 and the main body 3. This allows the sealing element 4 to be held in position by the plug-in insert 1. In addition, the flange 5.1.2 has a size and circumferential shape in the radial direction that is adapted to the recess which is formed in the main body 3 and into which the plug-in insert 1 is inserted, namely in such a way that the plug-in insert 1 is centered in the main body 3 by the flange 5.1.2.

The exemplary embodiment according to FIGS. 1 and 2 shows a first possibility of fixing the plug-in insert 1 in the main body 3. For this fixation, claws 5.1.3 are formed in the region of the second free end 5b. The claws 5.1.3 are formed by tabs which are formed integrally on the sleeve portion 5.1 and project obliquely upwards with respect to the longitudinal axis LA and are designed, after inserting the plug-in insert 1 into a recess of the main body 3, to anchor the plug-in insert 1 in this recess to thus prevent undesired release (for example, by a pressurized fluid accommodated in the tubular element 2) of the plug-in insert 1 from the main body 3. In this connection, the claws 5.1.3 can engage in a groove provided in the recess of the main body 3. Alternatively, the claws 5.1.3 can be designed to effect an anchoring of the plug-in insert 1 in the smooth wall of the recess of the main body 3 (i.e. recess that is free of grooves).

In the illustrated exemplary embodiment, a plurality of claws 5.1.3 are circumferentially distributed at the second free end 5b of the plug-in insert 1 and are arranged so as to be spaced apart from one another. Depending on the diameter of the plug-in insert, for example, four, six or more claws 5.1.3 can be provided. A flange segment of flange 5.1.2 can be provided between a pair of claws 5.1.3. This flange segment can have the shape of a circular-ring segment, i.e. extends only over a confined angular range. By means of the flange segments, for example, a centering of the plug-in insert 1 in the main body 3 is achieved. In some embodiments, as can be seen in FIG. 1, a foot area of the claw 5.1.3 forms a contact region for the sealing element 4 so that the foot areas of the claws 5.1.3 together with the flange segments located between the claws 5.1.3 jointly form the contact surface for the sealing element 4.

The claws 5.1.3 can enclose with the longitudinal axis LA of the plug-in insert 1 an acute angle which opens in the direction of the insertion opening E. The angle can have a value between 20° and 45°, in some embodiments between 25° and 35°, or in other embodiments substantially 30°.

The sleeve portion 5.1 is produced from one or more pieces of metallic flat material by means of a stamping, bending and forming technique. The at least one piece of flat material is first stamped. Subsequently, material forming of the at least one piece of flat material is performed, for example in which the bead 5.1.1 is formed by an embossing process and/or the flange 5.1.2 and the claws 5.1.3 are produced by bending.

Figure 7:
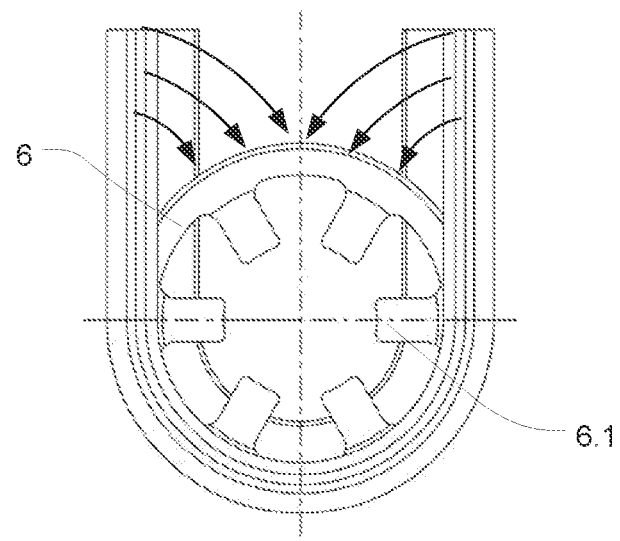
FIG. 7 shows, by way of example, and schematically the formation of a plug-in sleeve of a plug-in insert by circumferentially bending together a piece of material produced by a stamping, bending and forming technique.

In the case of a single piece of material forming the sleeve portion 5.1, this previously stamped and formed piece of material is then bent together to form a tube-like body so that the longitudinal sides of the piece of material are oriented towards one another and can abut one another so that a joint is formed. The bending together of a stamped and formed piece of material into a tubular plug-in sleeve is schematically shown in FIG. 7, the bent arrows illustrating the bending process. At least partial welding can be carried out at the joint.

In case that the sleeve portion 5.1 is formed by a plurality of pieces of material, as shown in FIG. 2, the previously stamped and formed pieces of material are then bent in each case to form a shell-shaped wall element 5A, 5B. In the case of two wall elements, these elements are designed in a half-shell shape. They can be identical or different in shape but are designed to match each other in such a way that a circumferentially closed element is formed after the shell-shaped wall elements 5A, 5B are assembled. Due to the subsequent assembly of the wall elements 5A, 5B, the sleeve portion 5.1 is formed. In the case of more than two wall elements 5A, 5B, these elements each form a shell-shaped sector of the sleeve portion 5.1, the sleeve portion 5.1 being formed by assembling three or more of these bowl-shaped sectors. After the wall elements 5A, 5B are assembled, at least partial welding can be performed at the joints. In some embodiments, the wall elements 5A, 5B are welded at the joints in the area of the flange 5.1.2. Alternatively or additionally, it is also possible for the wall elements 5A, 5B to be held together in interlocking manner, for example by means of intermeshing dovetails.

As explained above, a collar portion 5.2 is provided in the region of the first free end 5a of the plug-in sleeve 5. The collar portion 5.2 can in some embodiments effect a free-end radial widening of the plug-in sleeve 5. The outer diameter of the collar portion 5.2 can in some embodiments be selected in such a way that an opening area of the main body 3 that has the shape of a circular ring and extends around the outside of the sleeve portion 5.1 is completely covered by the collar portion 5.2.

In the illustrated exemplary embodiment, the collar portion 5.2 and the sleeve portion 5.1 are separately manufactured parts that are subsequently assembled. The collar portion 5.2 of the support sleeve 5 can thus be manufactured as a separate collar element 8 from a piece of flat material which is formed into an element having the shape of a circular ring by stamping, bending and deep drawing. After the sleeve portion 5.1 and the collar element 8 are manufactured, the collar element 8 is placed on the sleeve portion 5.1, specifically on the upper free end opposite the flange 5.1.2. The collar element 8 can be connected to the sleeve portion 5.1 in a force-locking or firmly bonded manner. In some embodiments, the connection between the collar element 8 and the sleeve portion 5.1 can be made by material portions that engage in one another or intermesh. Alternatively or additionally, a connection between the collar element 8 and the sleeve portion 5.1 can be made by partial welding. In some embodiments, the sleeve portion 5.1 and the collar element 8 are produced simultaneously on a common stamping and bending machine, for example on two process lines of a stamping and bending machine, the process lines being provided on opposite sides of the machine. The conveying of pieces of the flat material required for forming the sleeve portion 5.1 and the collar element 8 can in this case be carried out by means of two carrier belts independent of one another, namely the at least one piece of flat material for the sleeve portion 5.1 by means of a first carrier belt and the piece of flat material for the collar element 8 on a second carrier belt.

Alternatively, it is conceivable that the sleeve portion 5.1 and the collar element 8 are manufactured on a single process line, the pieces of flat material that are necessary for forming the sleeve portion and the collar element being arranged on a single carrier belt so that they are conveyed by means of the movement of the carrier belt.

In the illustrated exemplary embodiment, the sleeve portion 5.1 has a height contouring or stepping at its free end opposite to the flange 5.1.2. On its inner circumferential side, the collar element 8 has a contouring that is adapted to the height contouring or stepping of the sleeve portion 5.1 so that the collar element 8 can be placed on the sleeve portion 5.1 in an interlocking manner. The contouring of the sleeve portion 5.1 can in some embodiments be formed by a plurality of tabs 5.1.4 which project upwards in parallel to the longitudinal axis LA.

In some embodiments, the collar element 8 has the shape of a circular ring and a contour that is U-shaped in cross-section in first portions and an L-shaped contour in cross-section in second portions. The first and second portions are circumferentially distributed and alternate circumferentially so that a first portion with a U-shaped cross-sectional contour is followed by an L-shaped cross-sectional contour and then again by a U-shaped cross-sectional contour, etc.

A wall portion 8.2 projects from an upper side 8.1 of the collar element 8 on the outer circumferential side. Due to the alternating sequence of first and second portions, recesses 8.4 bounded alternately by pairs of stop portions 8.3 are formed on a radially inner surface of the collar element 8, in which recesses the tabs 5.1.4 of the sleeve portion 5.1 engage. The stop portions 8.3 are shaped in such a way that they overlap the wall of the sleeve portion 5.1. The stop portions 8.3 project radially inwards relative to the wall of the sleeve portion 5.1. The free ends of the stop portions 8.3 provide a stop for the release member 7, as can be seen in FIG. 1. On the outside, the release member 7 has a projection 7.1, in some embodiments a hook-like projection, which comes to an abutment opposite to the free ends of the stop portions 8.3 so that the release member 7 is prevented from being pushed out of the plug-in sleeve 5.

Alternatively, the collar portion 5.2 of the plug-in sleeve 5 can be manufactured integrally with the sleeve portion 5.1, i.e. an upper portion of the flat material which has been formed into the sleeve portion 5.1 is machined so as to form the collar portion 5.2. In this case, inwardly projecting detents can be provided on the sleeve portion to confine the movement path of the release member 7.

As can be seen in the illustrated embodiments in FIG. 2, the release member 7 can have at least two longitudinal slots 7.2. The longitudinal slots 7.2 are provided, for example, on the insertion portion 7a, which can be inserted into sleeve portion 5.1 of the plug-in insert 1. The longitudinal slots 7.2 extend from the free end of the insertion portion 7a in the direction of the collar 7b. Due to the at least two longitudinal slots 7.2, the insertion portion 7a is segmented in such a way that the insertion portion 7a can taper reversibly in the radial direction in order to be able to be inserted through the collar portion 5.2, in some embodiments the collar element 8, and then to be able to engage behind the stop portions 8.3 after a radial expansion by means of the projection 7.1.

Figure 3:
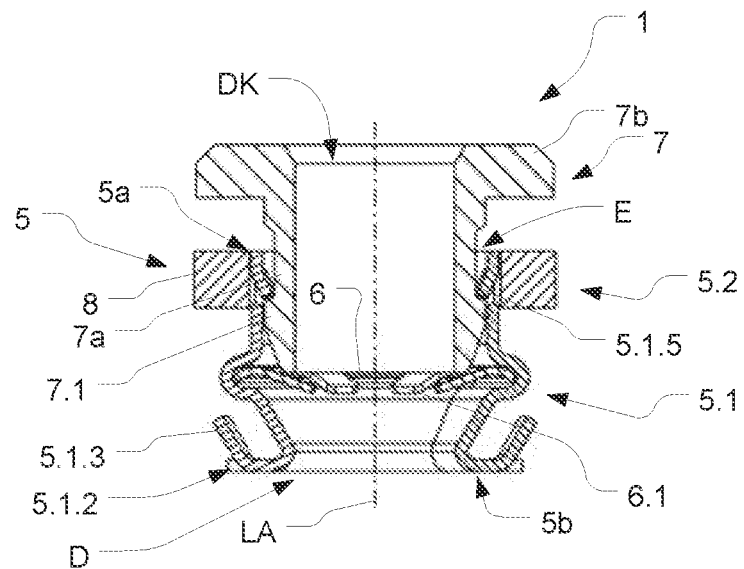
FIG. 3 shows, by way of example, a longitudinal sectional view of a second exemplary embodiment of a plug-in insert.

FIG. 3 shows a second exemplary embodiment of the plug-in insert 1. Only the differences of the second exemplary embodiment of the plug-in insert 1 are described below. In all other respects, the above explanations concerning the first exemplary embodiment also apply to this second exemplary embodiment.

The essential difference between the second exemplary embodiment and the first exemplary embodiment is that the collar element 8 is formed by a ring made from a solid material, which ring is made for example by stamping. Thus, the collar element 8 has a square or rectangular contour in cross-section, as can be seen in FIG. 3.

The collar element 8 is pushed on the outside over the sleeve portion 5.1 in such a way that the upper edge of the sleeve portion 5.1, which is not contoured in the illustrated exemplary embodiment, i.e. does not have any upwardly projecting tabs, is flush with the upper side 8.1 of the collar element 8.

The collar element 8 can be connected to the sleeve portion 5.1 in a force-locking and/or firmly bonded manner. For example, the collar element 8 can be pressed onto the sleeve portion 5.1 and/or connected thereto by welding.

In order to upwardly confine the movement path of the release member 7, inwardly projecting detents 5.1.5 are provided on the sleeve portion 5.1, which cooperate with the hook-like projection 7.1 of the release member 7. In this way, undesired release of the release member 7 from the sleeve portion 5.1 can be prevented.

Figure 4:
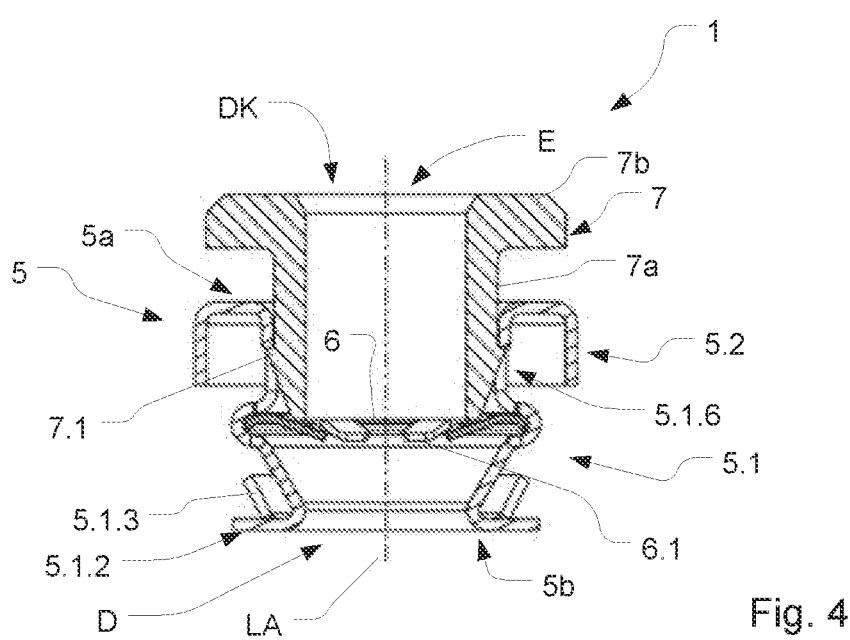
FIG. 4 shows, by way of example, a longitudinal sectional view of a third exemplary embodiment of a plug-in insert.

FIG. 4 shows a third exemplary embodiment of the plug-in insert 1. Only the differences between the third exemplary embodiment of the plug-in insert 1 and the first or second exemplary embodiment are described below. In all other respects, the above explanations with regard to the first or second exemplary embodiment also apply to this third exemplary embodiment.

The essential difference between the third exemplary embodiment and the first and second exemplary embodiment is that the collar portion 5.2 is not formed by a separate collar element placed on the sleeve portion 5.1 but is formed integrally on the sleeve portion 5.1. In some embodiments, the collar portion 5.2 can be formed by an outwardly projecting material portion of the sleeve portion 5.1 produced by forming, in some embodiments a bending process. The collar portion 5.2 can have an upper side extending perpendicularly to the longitudinal axis of the plug-in insert 1 and a wall portion projecting radially outwards and downwards from this upper side. Other shapes of the collar portion 5.2 are also possible.

The movement path of the release member 7 is upwardly confined by recesses 5.1.6, which are provided on the sleeve portion 5.1. The release member 7 has hook-like projections 7.1, which engage in the recesses 5.1.6. This can prevent undesired release of the release member 7 from the sleeve portion 5.1.

In the above described exemplary embodiments according to FIGS. 1 to 4, the fixing element 6 is held in the bead 5.1.1 of the sleeve portion 5.1 in an interlocking fashion. It is introduced during the circumferential bending of the preformed material portion (see FIG. 7) or the joining together of the wall elements 5A, 5B and is interlockingly fixed in the sleeve portion 5.1 after the bending or joining together.

Figure 5:
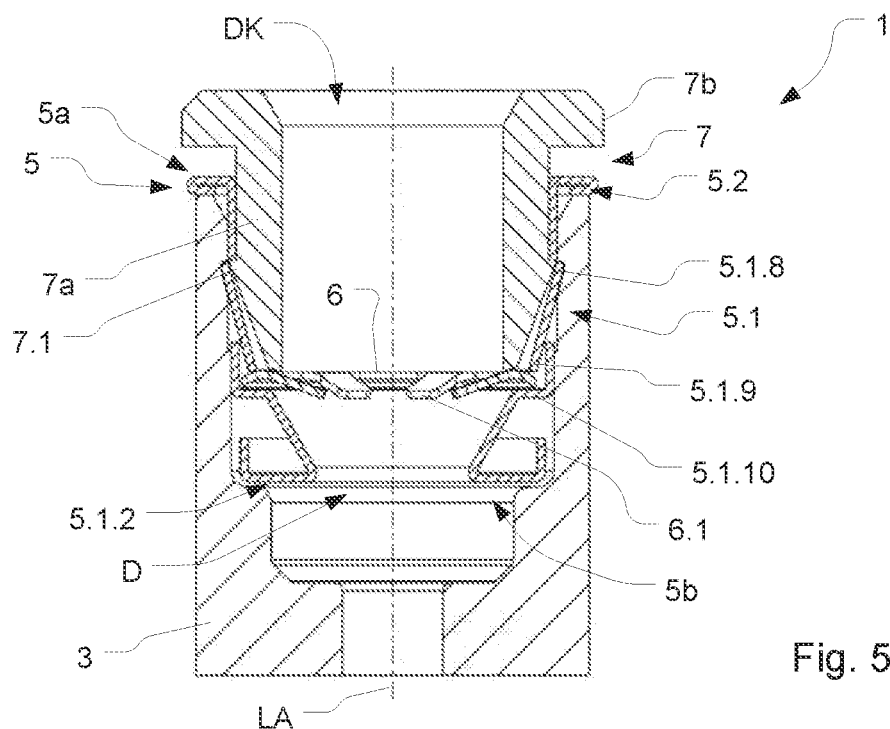
FIG. 5 shows, by way of example, a longitudinal sectional view of a fourth exemplary embodiment of a plug-in insert.

FIG. 5 shows an alternative way of interlockingly fixing the fixing element 6 in the plug-in sleeve 5. For this purpose, the plug-in sleeve 5 has a plurality of circumferentially distributed locking detents 5.1.9 which project into the interior of the plug-in sleeve 5. The locking detents 5.1.9 are of tongue-like design and project obliquely into the interior of the plug-in sleeve 5 in such a way that the free end of the locking detent 5.1.9 points in the direction of the second free end 5b of the plug-in sleeve 5.

The plug-in sleeve 5 also has, in the insertion direction of the tubular element 2 below the free end of the locking detent 5.1.9, a shoulder 5.1.10, which forms a contact surface for the fixing element 6, in some embodiments the edge region of the fixing element 6. The shoulder 5.1.10 can run at right angles to the longitudinal axis LA or have a free-form geometry, for example a geometry having curves.

The plug-in sleeve 5 is designed in such a way that the fixing element 6 can be inserted into the plug-in sleeve 5 from the first free end 5a, namely after the tubular sleeve portion 5.1 is produced (i.e. after the wall elements 5A, 5B are bent or joined together). When the fixing element 6 is pressed in, the locking detents 5.1.9 are reversibly bent outwards. After passing the free ends of the locking detents 5.1.9, they deform back into the original position so that the locking detents 5.1.9 engage behind the edge of the fixing element 6. The free ends of the locking detents 5.1.9 are arranged at such a distance from the shoulder 5.1.10 that the fixing element 6 is fixed between the locking detents 5.1.9 and the shoulder 5.1.10 without play or substantially without play.

In the exemplary embodiment of FIG. 5, an alternative type of fixing of the plug-in insert 1 in the main body 3 is also provided in comparison to the exemplary embodiments of FIGS. 1 to 4.

Here, the fixation is effected by means of detents 5.1.8, which are provided in a circumferentially distributed fashion over the plug-in sleeve 5. The detents 5.1.8 project externally from the outside of the plug-in sleeve 5. The detents 5.1.8 are of tongue-like design and project outwardly at an angle in such a way that the free end of the detents 5.1.8 points in the direction of the first free end 5a of the plug-in sleeve 5. In contrast to the above described exemplary embodiments, the detents 5.1.8 are provided in the upper region of the insertion sleeve 5, in some embodiments in a region between the insertion opening E and the fixing element 6. The detents 5.1.8 are designed in such a way that they are initially reversibly pressed inwards when they are pressed into the main body 3. In some embodiments, a groove or undercut is provided in the main body 3, in which the detents 5.1.8 can engage so as to achieve locking of the plug-in sleeve 5 and thus of the plug-in insert 1 in the main body 3. Alternatively, the detents 5.1.8 can be designed to engage in a groove- or undercut-free, smooth wall of the recess of the main body 3.

In some embodiments, the outwardly projecting detents 5.1.8 expose, in the wall of the plug-in sleeve 5, recesses 5.1.6 in which projections 7.1 of the release member 7 can engage in order to confine the movement path of the release member 7 away from the fixing element 6.

Figure 6:
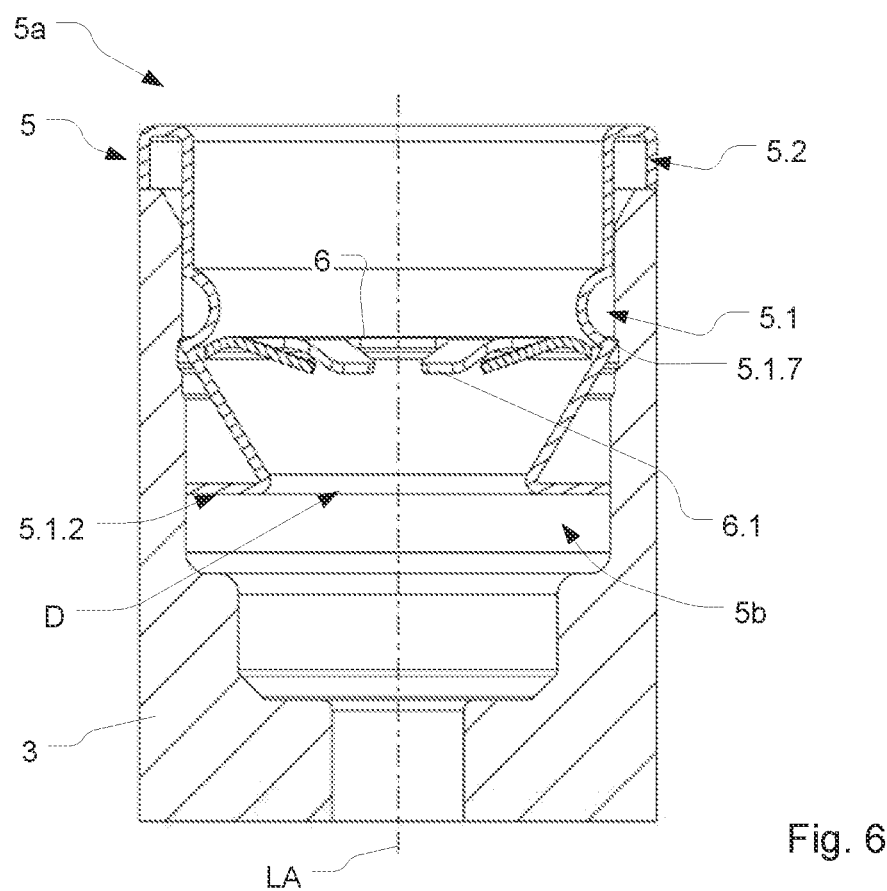
FIG. 6 shows, by way of example, a longitudinal sectional view of a fifth exemplary embodiment of a plug-in insert.

FIG. 6 schematically shows a further exemplary embodiment of a plug-in insert 1.

The essential difference with regard to the above described exemplary embodiments is that the plug-in insert 1 is fixed in the main body 3 by means of a press connection. Here, at least one rib 5.1.7 is provided on the outer circumferential side of the plug-in sleeve 5, which cooperates with an inner circumferential surface of the main body 3 and secures the plug-in sleeve 5 in the main body 3 by a force lock.

As described above with reference to FIGS. 1 to 4, the plug-in sleeve 5 can have a bead 5.1.1, in which the fixing element 6 is held at the edge. The rib 5.1.7, by means of which the plug-in sleeve 5 is fixed in the main body 3, can be formed by the outer wall portion of the plug-in sleeve 5 in the region of the bead 5.1.1, i.e. by the ridge forming by shaping the bead 5.1.1 on the outer circumferential side. Alternatively, an additional contour can be provided on the outer circumferential side at the level of the bead 5.1.1, to form the rib 5.1.7. Other or further contours for forming a press connection to the main body 3 are also possible.

On the inner circumferential side, the main body 3 can have a recess or undercut into which the at least one rib 5.1.7 can dip in order to also achieve an interlocking connection between the plug-in sleeve 5 and the main body 3. Alternatively, the rib 5.1.7 can be designed to produce a press fit on a groove- or undercut-free, smooth wall of the recess of the main body 3.

Figure 8:
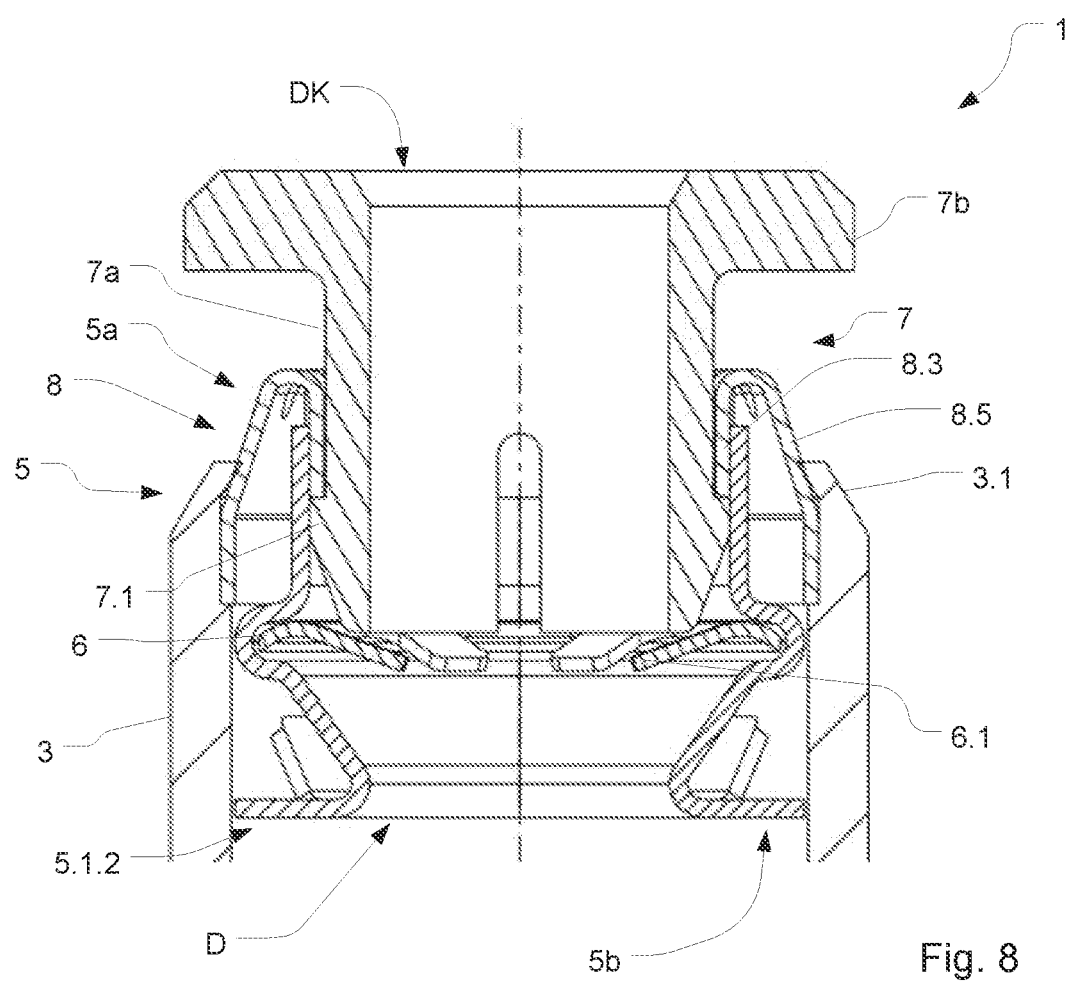
FIG. 8 shows, by way of example, a longitudinal sectional view of a sixth exemplary embodiment of a plug-in insert, which is fixed in the main body by a beaded edge region of said main body.
Figure 9:
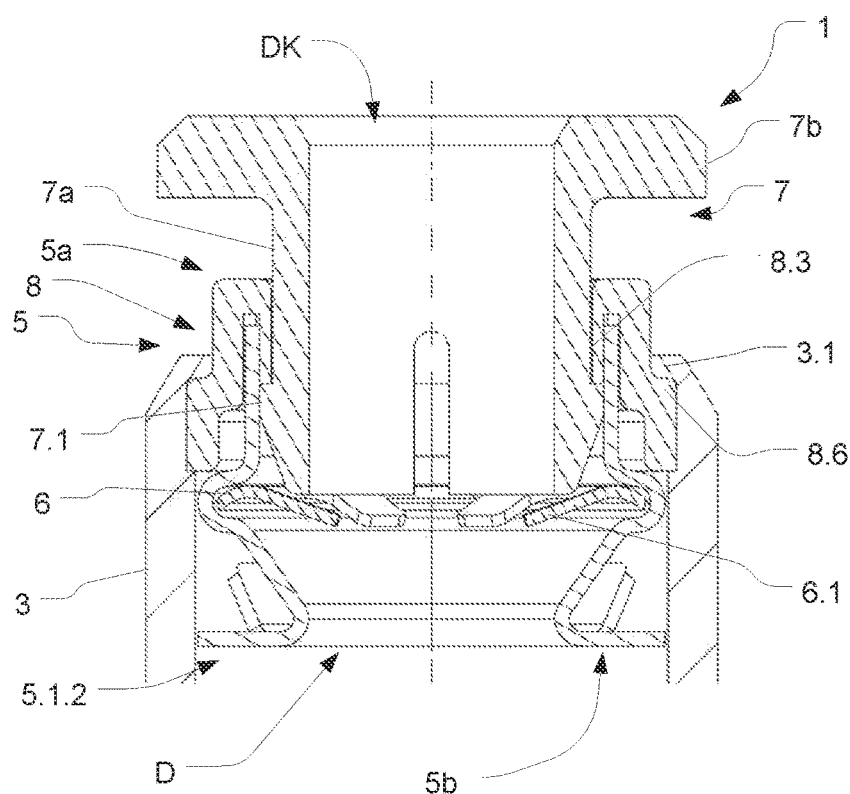
FIG. 9 shows, by way of example, a longitudinal sectional view of a seventh exemplary embodiment of a plug-in insert, which is fixed in the main body by a beaded edge region of said main body.
Figure 10:
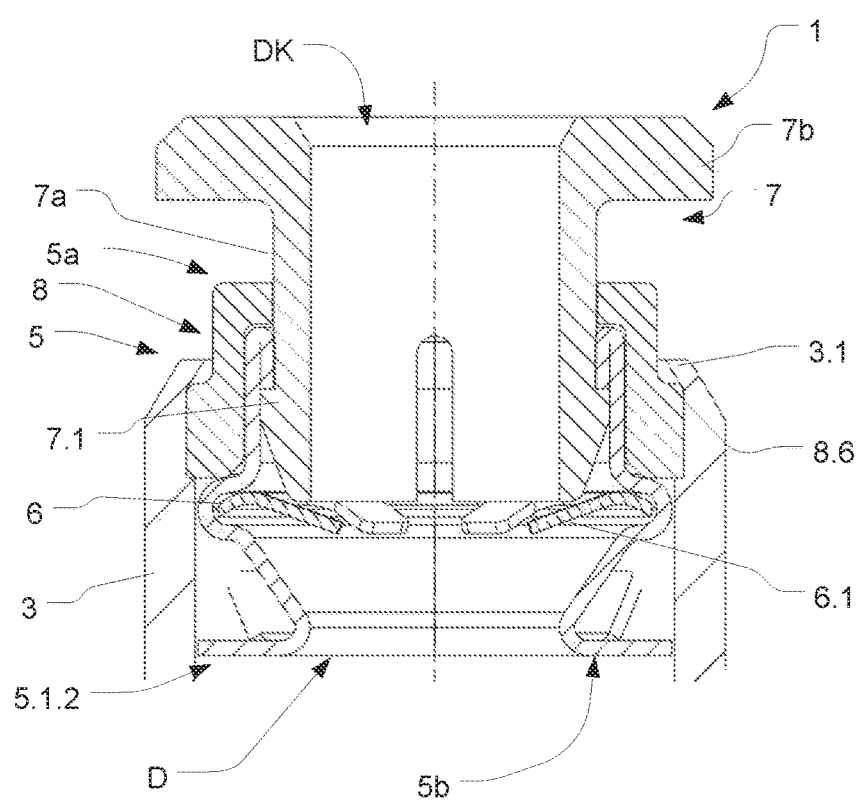
FIG. 10 shows, by way of example, a longitudinal sectional view of an eighth exemplary embodiment of a plug-in insert, which is fixed in the main body by a beaded edge region of said main body.

FIGS. 8 to 10 show further embodiments of a plug-in insert 1 which is provided for use in a metallic main body 3 and is fixed therein by flanging the edge region 3.1 of the recess of the main body 3.

The differences between the embodiments of the plug-in insert 1 according to FIGS. 8 to 10 and the embodiment of FIGS. 1 and 2 are described below. In all other respects, the above described technical features of the embodiment of FIGS. 1 and 2 also apply to the embodiments according to FIGS. 8 to 10.

The essential difference between the plug-in insert 1 of FIGS. 8 to 10 and the plug-in insert 1 shown in FIGS. 1 and 2 is that the collar element 8 has a contact surface which cooperates with the beaded edge region 3.1 of the main body 3 in such a way that an axially acting holding force is exerted on the plug-in insert 1, i.e. the plug-in insert 1 cannot be detached from the main body 3 because the flanged edge region 3.1 at least partially overlaps the collar element 8.

FIG. 8 shows an embodiment of a plug-in insert 1 in which the collar element 8 is formed from a flat material which is formed into an annular element by means of a stamping and bending process. The collar element 8 has a ring-like shape and is in turn placed on the free end of the sleeve portion 5.1, in such a way that a stop portion 8.3 overlapping the upper edge of the sleeve portion 5.1 comes to lie in the lead-through channel DK and thereby forms a stop surface for the release member 7.

The collar element 8 can have on the outside, for example, an inclined surface which can be a circumferential surface which tapers in the direction of the collar 7b of the release member 7 and runs circumferentially around the collar element 8. The inclined surface is designed to cooperate with the beaded edge region 3.1 of the main body 3 in order to thereby fix it axially in the main body 3.

FIG. 9 shows a further exemplary embodiment of a plug-in insert 1 that is fixed in the main body 3 by a beaded edge region 3.1.

The ring-like collar element 8 is produced, for example, by means of metal injection molding (MIM). The production of the collar element 8 by means of metal injection molding offers the advantage that a highly stable collar element 8, which overlaps the free end of the sleeve portion 1 and at the same time exhibits a high degree of stability, can be produced at low cost.

In the illustrated exemplary embodiment, the collar element 8 has, on the outside, a shoulder 8.6, which is designed to be overlapped by a beaded edge region 3.1 of the main body 3 in order to achieve the fixing of the plug-in insert 1 in the main body 3.

Radially on the inside, the collar element 8 in turn has a stop portion 8.3 by means of which an undesired release of the release member 7 from the plug-in insert 1 is prevented.

FIG. 10 shows a further exemplary embodiment of a plug-in insert 1 in which the plug-in insert 1 is fixed in the main body 3 by a beaded edge region 3.1.

The ring-like collar element 8 is produced from a metal, for example as a turned part, and on the outside has a shoulder 8.6 which is designed to be overlapped by a beaded edge region 3.1 of the main body 3 in order to achieve the fixing of the plug-in insert 1 in the main body 3.

The collar element 8 has an internal stepping which forms an abutment for the free-end edge of the sleeve portion 5.1. For manufacturing reasons, it can be advantageous in the case of a collar element 8 produced as a turned part for the collar element 8 itself not to have a stop portion for the release member 7. Advantageously, stop portions for the release member 7 are provided in the region of the free end of the sleeve portion 5.1. These stop portions can be formed, for example, by beading the edge region of the free end of the sleeve portion 5.1.

The invention has been described above with reference to exemplary embodiments. It is understood that numerous modifications as well as variations are possible without leaving the scope of protection defined by the claims.

LIST OF REFERENCE SIGNS

1 plug-in insert
2 tubular element
3 main body
4 sealing element
5 plug-in sleeve
5A,5B wall element
5a first free end
5b second free end
5.1 sleeve portion
5.1a first region
5.1b second region
5.1c third region
5.1d fourth region
5.1.1 bead
5.1.2 flange
5.1.3 claws
5.1.4 tabs
5.1.5 detent
5.1.6 recess
5.1.7 rib
5.1.8 detent
5.1.9 locking detent
5.1.10 shoulder
5.2 collar portion
6 fixing element
6.1 claws
7 release member
7a insertion portion
7b collar
7.1 projection
7.2 longitudinal slot
8 collar element
8.1 upper side
8.2 wall portion
8.3 stop portion
8.4 recess
D lead-through opening
DK lead-through channel
E insertion opening
LA longitudinal axis In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A plug-in insert configured for insertion into a main body, the plug-in insert configured to releasably couple a tubular element in the main body, the plug-in comprising:
   a plug-in sleeve;
   a fixing element; and
   a release member,
   wherein the fixing element is configured to releasably fix a tubular element, inserted via an insertion opening, in the plug-in sleeve and the release member cooperates with the fixing element in such a way that the fixing of the tubular element is released by an axial movement of the release member relative to the plug-in sleeve,
   wherein the plug-in sleeve comprises a sleeve portion formed of at least one wall element, wherein the at least one wall element is formed by stamping and bending a metallic flat material portion into a shell-shaped or circumferentially closed member, wherein the plug-in sleeve has, at a second free end, opposite to the insertion opening, a flange that forms a contact surface for contacting a sealing element which seals the transition between the tubular element and the main body,
   wherein fixing members formed integrally with the plug-in sleeve are provided for fixing the plug-in sleeve in the main body,
   wherein the fixing members are provided for fixing the plug-in insert in the main body, and
   wherein the fixing members are formed by a plurality of claws distributed circumferentially at the second free end of the plug-in sleeve, and wherein foot areas of the claws together with the flange jointly form the contact surface for contacting the sealing element.

2. The plug-in insert of claim 1, wherein the flange comprises a plurality of flange segments which project radially outwards with respect to a longitudinal axis of the plug-in insert and are arranged spaced apart from one another in the circumferential direction, and wherein the claws are provided so as to be distributed circumferentially in the intermediate spaces forming between the flange segments, with one or more claws in each case in an intermediate space forming between two successive flange segments.

3. The plug-in insert of claim 1, wherein the sleeve portion is formed by a single piece of flat material which is stamped, formed and bent together to form a circumferentially closed element.

4. The plug-in insert of claim 1, wherein the sleeve portion comprises at least two stamped, shaped, and shell-shaped bent pieces of flat material as wall elements, which are joined together to form a circumferentially closed sleeve portion.

5. The plug-in insert of claim 1, wherein the fixing element is a disk-shaped claw ring which is fixed in the plug-in sleeve and has, on the inner circumferential side, a plurality of reversibly bendable claws for fixing the tubular element.

6. The plug-in insert of claim 5, wherein the fixing element has, in a transition region between an annular portion of the claw ring and the plurality of reversibly bendable claws of the fixing element, a curvature, the convex side of which points in the direction of the insertion opening.

7. The plug-in insert of claim 1, wherein the sleeve portion tapers in a funnel shape between a central region, in which the fixing element is held, and a second free end of the plug-in sleeve opposite to the insertion opening.

8. The plug-in insert of claim 1, wherein the plug-in sleeve has, at a first free end at which the insertion opening for the tubular element is provided, a separate collar element.

9. The plug-in insert of claim 8, wherein the collar element is a ring element made of a flat material, which has a wall portion projecting at an angle from an upper side and being closed on the outer circumferential side.

10. The plug-in insert of claim 8, wherein the collar element has on the inner circumferential side a plurality of stop portions for confining the axial movement path of the release member.

* * * * *